United States Patent
Hendrickson et al.

(10) Patent No.: US 9,708,959 B2
(45) Date of Patent: Jul. 18, 2017

(54) FILTERING METHOD FOR INTERMITTENT ULTRASONIC LEVEL SENSORS

(71) Applicant: Ford Global Technologies, LLC, Dearborn, MI (US)

(72) Inventors: Cory Scott Hendrickson, Ann Arbor, MI (US); Michiel J. Van Nieuwstadt, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 567 days.

(21) Appl. No.: 13/940,140

(22) Filed: Jul. 11, 2013

(65) Prior Publication Data

US 2015/0019108 A1  Jan. 15, 2015

(51) Int. Cl.
- *F01N 11/00* (2006.01)
- *G01F 23/296* (2006.01)
- *F01N 3/20* (2006.01)

(52) U.S. Cl.
CPC ............ *F01N 11/00* (2013.01); *G01F 23/296* (2013.01); *F01N 3/208* (2013.01); *F01N 2610/02* (2013.01); *F01N 2610/142* (2013.01); *F01N 2900/1814* (2013.01); *Y02T 10/47* (2013.01)

(58) Field of Classification Search
CPC .... G01F 23/28; G01F 23/296; G01F 23/2962; G01F 23/2965; F01N 11/00
See application file for complete search history.

(56) References Cited

U.S. PATENT DOCUMENTS

| | | | |
|---|---|---|---|
| 6,345,683 B1* | 2/2002 | Gordon et al. | 181/124 |
| 8,117,834 B2 | 2/2012 | Toshioka et al. | |
| 8,240,136 B2 | 8/2012 | Kurtz et al. | |
| 8,505,371 B2 | 8/2013 | Zimmerman et al. | |
| 2006/0086080 A1* | 4/2006 | Katogi et al. | 60/278 |
| 2011/0167805 A1 | 7/2011 | Chen | |
| 2012/0304744 A1 | 12/2012 | Takahashi et al. | |
| 2013/0055700 A1 | 3/2013 | Minezawa et al. | |
| 2013/0125997 A1 | 5/2013 | Lawrence et al. | |
| 2013/0160433 A1* | 6/2013 | Schepers | G01F 23/00 60/295 |

FOREIGN PATENT DOCUMENTS

| | | |
|---|---|---|
| WO | 2010056852 A1 | 5/2010 |
| WO | 2012138936 A1 | 10/2012 |

* cited by examiner

*Primary Examiner* — Jacob Amick
(74) *Attorney, Agent, or Firm* — Julia Voutyras; McCoy Russell LLP

(57) ABSTRACT

Methods are provided for determining an exhaust fluid level in an exhaust fluid storage tank based on a signal, and a quality of the signal from an exhaust fluid level sensor located in the exhaust fluid tank of a vehicle.

17 Claims, 11 Drawing Sheets

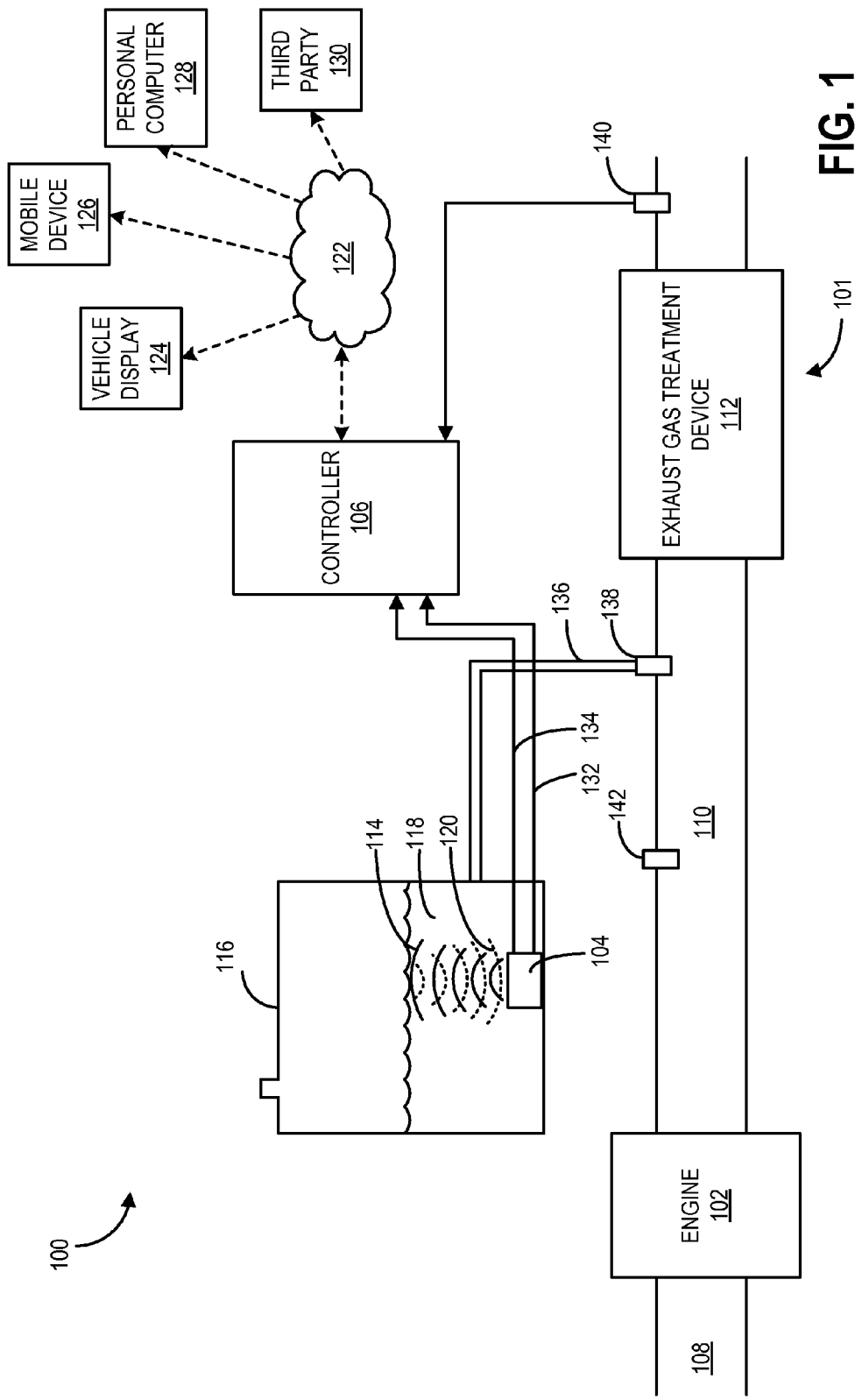

FILTERING METHOD FOR INTERMITTENT ULTRASONIC LEVEL SENSORS

TECHNICAL FIELD

The present application relates to methods for estimating levels of exhaust fluid in an exhaust fluid storage tank by utilizing an ultrasonic level sensor.

BACKGROUND AND SUMMARY

In order to regulate emissions from the exhaust system of a vehicle, exhaust gas treatment systems are employed in an engine's exhaust passage. In some examples, the exhaust gas treatment system may include a selective catalytic reduction (SCR) system to reduce nitrogen oxide ($NO_x$) emissions from the exhaust. Vehicles equipped with the SCR system inject a reducing agent, such as an aqueous solution of urea ($(NH_2)_2CO$), into the exhaust passage upstream of a SCR catalyst. The urea solution upon thermal decomposition in the exhaust passage forms ammonia ($NH_3$), which is then adsorbed onto the catalyst surface. $NO_x$ gases in the exhaust passage react with the adsorbed ammonia to form nitrogen ($N_2$) and water ($H_2O$), for example.

The aqueous urea solution may be stored in an exhaust fluid storage tank on-board the vehicle and monitored, so that appropriate default action can be taken if insufficient solution is maintained, or if improper diluents are added. Tank level sensors may be utilized to detect the quantity of urea remaining in the tank in order to aid monitoring of the SCR system. When the level of urea solution is low, a warning may be indicated to the driver. Likewise, changes in the level may be used in combination with other data to detect a quality of the solution. However, during certain vehicle operating conditions, when the exhaust fluid tank is subjected to acceleration and/or inclination, the level sensor may indicate incorrect liquid level measurements.

One example approach to address incorrect level measurements by the level sensor is provided by Minezawa et al. in US 2013/0055700. Therein, an output of a urea level sensor is passed through a low-pass filter having a time constant based on engine speed. However, the inventors herein have identified potential issues with such an approach. For example, Minezawa's approach assumes distortions in level sensor measurements are correlated to vibrations caused by speed, and does not account for loss of signal due to inclination of the exhaust fluid storage tank or surface ripple, which may occur when the vehicle is in motion and when the vehicle is at rest. For example, certain vehicle operating conditions, which cause sloshing or inclination of the tank, may increase or decrease the height of the liquid above the sensor even though there may be no change in the total quantity of liquid in the tank. This sloshing and/or ripple does not just cause measurement errors, but may actually cause a lack of signal when using an ultrasonic sensor configuration. The loss of signal can drastically impact the estimate, even if filtered with a low pass filter. Further, such loss of signal situations have little to no correlation with engine speed.

In one example, the above issues may be at least partly addressed by a method, such as a method for an exhaust selective catalytic reduction system. The method may comprise generating an ultrasonic signal in an exhaust fluid tank of a vehicle and indicating fluid level based on a filtered reflection of the ultrasonic signal, the reflection filtered based on a strength or other quality of the received reflection. For example, strength of the reflected signal may be below a threshold due to an inclination of the urea surface. Consequently, the reflected signal may have a lower quality that can be used to differentiate between large changes in sensor output that are cause by mis-reflections versus large changes in sensor output cause by large changes in the fluid level itself. In this way, by filtering the level measurement from the sensor based on quality of the reflected signal, as well as based on the level measurements themselves, more accurate level measurements may be obtained.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The subject matter of the present disclosure will be better understood from reading the following detailed description of non-limiting embodiments, with reference to the attached drawings.

FIG. 1 shows a schematic diagram of a vehicle system including an exhaust treatment system with one exhaust fluid storage tank.

DETAILED DESCRIPTION

Figure 2A:
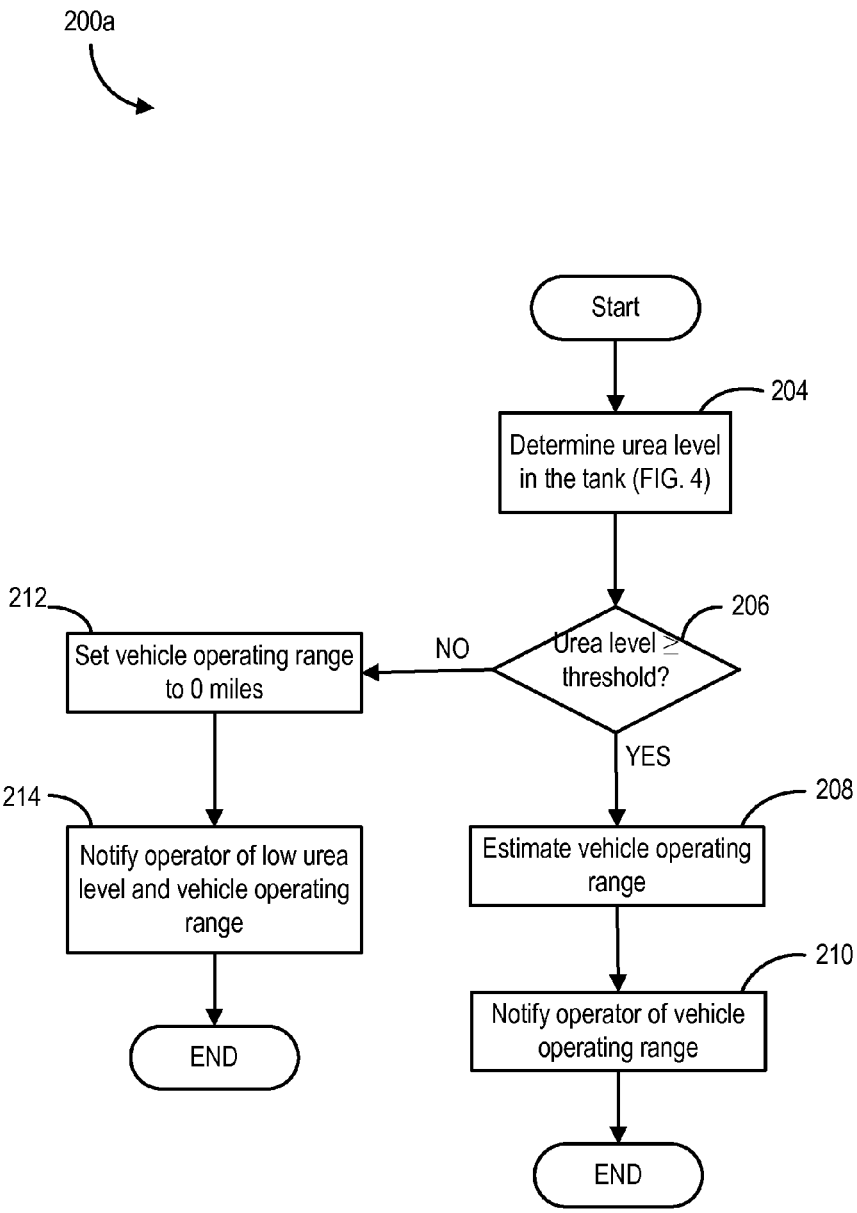
FIGS. 2A-2E show flowcharts illustrating routines for notifying vehicle operator of vehicle operating parameters based on fluid level in an exhaust fluid storage tank.

Methods and systems are provided for estimating an exhaust fluid level in an exhaust fluid storage tank coupled to an exhaust passage in an exhaust treatment system included in a vehicle system (such as vehicle system of FIG. 1). A controller may perform a routine such as the routine at FIG. 3 to initialize a filter for exhaust fluid level measurement. The controller may then perform a routine such as routine at FIG. 4 to estimate a level of exhaust fluid in the exhaust fluid tank. Herein, exhaust fluid level may be measured based on a quality of reflected signal received by an ultrasonic sensor located within the exhaust fluid tank. Exhaust fluid level measurement thus obtained may be used to determine vehicle operating parameters as illustrated at FIGS. 2A-2E. An example of exhaust fluid level measurement is shown at FIG. 5.

FIG. 1 shows a schematic diagram of a vehicle system 100. Vehicle system 100 includes engine 102 which may be included in a propulsion system of a vehicle. Engine 102 may be controlled at least partially by a control system including controller 106 and by input from a vehicle operator via an input device (not shown). Intake air is inducted into engine 102 via intake passage 108, an exhaust gas resulting from combustion in engine 102 is exhausted via exhaust passage 110 leading to a tailpipe (not shown) that eventually routes exhaust gas to the atmosphere.

As shown, an exhaust gas treatment system 101 including exhaust gas treatment device 112 is shown arranged along exhaust passage 110. In the example embodiment of FIG. 1, the exhaust gas treatment system 101 is a selective catalytic reduction system, and the exhaust gas treatment device 112 is a selective catalyst reduction (SCR) catalyst. The SCR catalyst system may include at least an SCR catalyst, an exhaust fluid storage tank 116, an exhaust fluid passage 136, and an exhaust fluid injector 138. In other examples, the exhaust gas treatment system may additionally or alternatively include a three way catalyst (TWC), a $NO_x$ trap, various other emission control devices, or combinations thereof. Further, as depicted, exhaust fluid injector 138 is disposed upstream of exhaust gas treatment device 112. Exhaust fluid injector 138 injects an exhaust fluid into the exhaust stream for reaction with $NO_x$ in exhaust gas treatment device 112 responsive to signals received from controller 106. The exhaust fluid may be a reductant, for example, such as urea or ammonia.

Exhaust fluid injector 138 is supplied with exhaust fluid 118 from exhaust fluid storage tank 116 via exhaust fluid passage 136. Exhaust fluid storage tank 116 may be a reservoir suitable for holding the exhaust fluid throughout a range of temperatures, for example. As depicted in FIG. 1, exhaust fluid storage tank 116 includes an exhaust fluid level sensor 104. Exhaust fluid level sensor 104 may provide discreet exhaust fluid level readings to controller 106, for example. However, exhaust fluid level sensor 104 may effectively be a continuous level sensor by providing a relatively large number of discrete readings in a range from a near empty exhaust fluid level to a near full exhaust fluid level. In this manner, exhaust fluid level sensor 104 may provide an instantaneous indication of exhaust fluid level to controller 106 when the exhaust fluid level is within the near empty to near full range of exhaust fluid level sensor.

In one example, exhaust fluid level sensor may be an ultrasonic transducer. The ultrasonic transducer generates acoustic waves 114 that may be reflected off the liquid surface. Subsequently, reflected waves 120 may be received by the emitting transducer. Instantaneous liquid level may be determined based on time between emitted pulse and reflected pulse, and speed of sound, for example by utilizing propagation speeds of the ultrasonic wave. The ultrasonic transducer maybe activated periodically to provide level measurements at regular intervals. Further, a peak voltage amplitude output from the ultrasonic sensor may be utilized to determine quality of the reflected signal. It should be noted that the peak voltage amplitude of the received signal is separate and distinct from the measurement of the time difference, or frequency shift, or other measurement/indication of the level (e.g., position) at which the wave is reflected back to a receiver from the wave transmitter (both of which may be housed in sensor 104). Based on the instantaneous level measurement from the exhaust fluid level sensor, and quality of the reflected signal, level of exhaust fluid in the exhaust fluid storage tank may be determined. Based on the exhaust fluid level measurements, various parameters may be determined, such as vehicle operating range, and an amount of exhaust fluid that should be added to the exhaust fluid storage tank, as will be described in greater detail below with reference to FIGS. 2A-2E.

Exhaust gas treatment system further includes an exhaust gas sensor 140 positioned downstream of the exhaust gas treatment device 112. In the depicted embodiment, the exhaust gas sensor may be a $NO_x$ sensor for measuring an amount of post-SCR $NO_x$. In some examples, an efficiency of the SCR system may be determined based on the exhaust gas sensor 140, and further based on an exhaust gas sensor 142 positioned upstream of the SCR system. In some other examples, $NO_x$ sensor may be utilized to estimate a quality of the exhaust fluid refilled in the exhaust fluid storage tank.

Controller 106 may be a microcomputer including the following, although not shown in FIG. 1: a microprocessor unit, input/output ports, an electronic storage medium for executable programs and calibration values (e.g., a read only memory chip), random access memory, keep alive memory, electronically erasable programmable read only memory (EEPROM), and a data bus. Storage medium read-only memory may be programmed with computer readable data representing instructions executable by the microprocessor for performing the methods described below as well as other variants that are anticipated but not specifically listed. For example, the controller may receive communication (e.g., input data) from the various sensors, process the input data, and trigger the actuators in response to the processed input data based on instruction or code programmed therein corresponding to one or more routines. Example routines are described herein with reference to FIGS. 2-4. In one example, the controller may receive input data from the level sensor 104. The input data may include instantaneous level measurement 132, and an indication of quality of the reflected signal 134 received by the sensor 104. Based on quality of the reflected signal, the controller may estimate liquid level in the exhaust fluid tank.

Controller 106 sends signals to communications system 122, such as a wireless network or controller area network (CAN). For example, after processing data from exhaust fluid level sensor 104 and estimating a parameter, such as a vehicle operating range, controller 106 sends a message to communications system 122 indicating the parameter. Communications system 122 may then notify the operator of the vehicle via a display. In one example, the parameter may be displayed on vehicle display 124, such as a dashboard or other vehicle display. In another example, communications system 122 may send a message regarding the parameter to mobile device 126 of the operator in the form of a text message, for example, or to personal computer 128 in the form of an email. As yet another example, communications system 122 may additionally or alternatively send a message to a third party 130, such a selling dealership of the vehicle or another service center.

Thus, the vehicle system includes an exhaust gas treatment system which includes an exhaust fluid storage tank with an exhaust fluid sensor. By determining exhaust fluid level based on the instantaneous level measurement from the exhaust fluid level sensor, and the quality of the reflected signal, more accurate exhaust fluid level measurements may be obtained. Further, as will be described below, the controller may estimate a parameter based on the exhaust fluid level sensor readings and notify the operator of the vehicle of the parameter.

FIGS. 2A-2E show flow charts illustrating routines for determining various vehicle operating parameters, and for notifying an operator of a vehicle of various information regarding exhaust fluid in an exhaust fluid storage tank 116 based on a level sensor, such as exhaust fluid level sensor 104 disposed in exhaust fluid storage tank 116 described above with reference to FIG. 1. For example, the operator may be notified of an operating range of the vehicle, quality of refilled exhaust fluid, an amount of exhaust fluid to be added to the exhaust fluid storage tank to fill the tank, a usage rate of the exhaust fluid, and an estimated time until empty of the exhaust fluid storage tank. In the example routines described below with reference to FIGS. 2A-2E, urea is used as an example exhaust fluid. It should be understood, however, that the routines may be applied to any other suitable exhaust fluid.

Now turning to FIG. 2A, an example routine 200a is shown for displaying vehicle operating range to a vehicle operator.

At 204 of routine 200a, level of urea in the exhaust fluid storage tank may be determined. The urea level may be determined based on level measurement by the exhaust fluid level sensor such as an ultrasonic level sensor as described with reference to FIG. 1. The urea level may be further based on a quality of reflected signal received by the ultrasonic sensor. Details of determination of urea level in the tank will be further elaborated at FIG. 4.

Next, at 206, upon measuring the urea level in the exhaust fluid storage tank, it may be determined if the urea level is greater than or equal to a threshold level. For example, the threshold level may be a minimum level of urea that must be present in the exhaust fluid storage tank to ensure that the vehicle is operating within acceptable emission levels. At 206, upon confirming that the urea level in the storage tank is greater than or equal to the threshold, the controller may then estimate vehicle operating range at 208. For example, the vehicle operating range may indicate a distance that the vehicle may travel without the level of urea in the tank depleting below the threshold level. Vehicle operating range may be based on level of urea in the exhaust fluid storage tank and an average fuel economy of the vehicle under operation. Next, at 210, the controller may notify the operator of vehicle operating range.

Returning to 206, if the measured urea level is below the threshold level, the controller may set the vehicle operating range to 0 miles indicating that the vehicle may not travel without replenishing the urea in the storage tank. Subsequently at 214, the vehicle operator may be notified of the vehicle operating range and a warning may be displayed indicating low urea level in the tank.

For example, the vehicle operating range and/or low urea level warning may be displayed on a dashboard of the vehicle. In some examples, the operator may be notified via a communications system, such as WIFI, Bluetooth, SYNC, or the like. For example, the controller may send a message to the operator via the communications system. The message may be displayed on a vehicle display on the dashboard or another location of the vehicle, sent to a mobile device of the operator (e.g., via a text message), emailed to the operator, etc.

In other examples, the controller may additionally or alternatively send a message via the communications system notifying a third party of the vehicle operating range and/or low urea level warning. For example, the third party may be a vehicle dealership at which the operator purchased the vehicle and/or to which the operator takes the vehicle for service, or the third party may be another vehicle service center.

In this way, the vehicle operating range may be determined based on the urea level in the exhaust fluid storage tank. Upon determining the vehicle operating range, the operator of the vehicle may be notified of the vehicle operating range directly by the controller via a display in the vehicle, or a message sent to a suitable computing device such as a mobile device or personal computer. The user may also be notified of the vehicle operating range via a third party, such as the vehicle dealership.

Figure 2B:
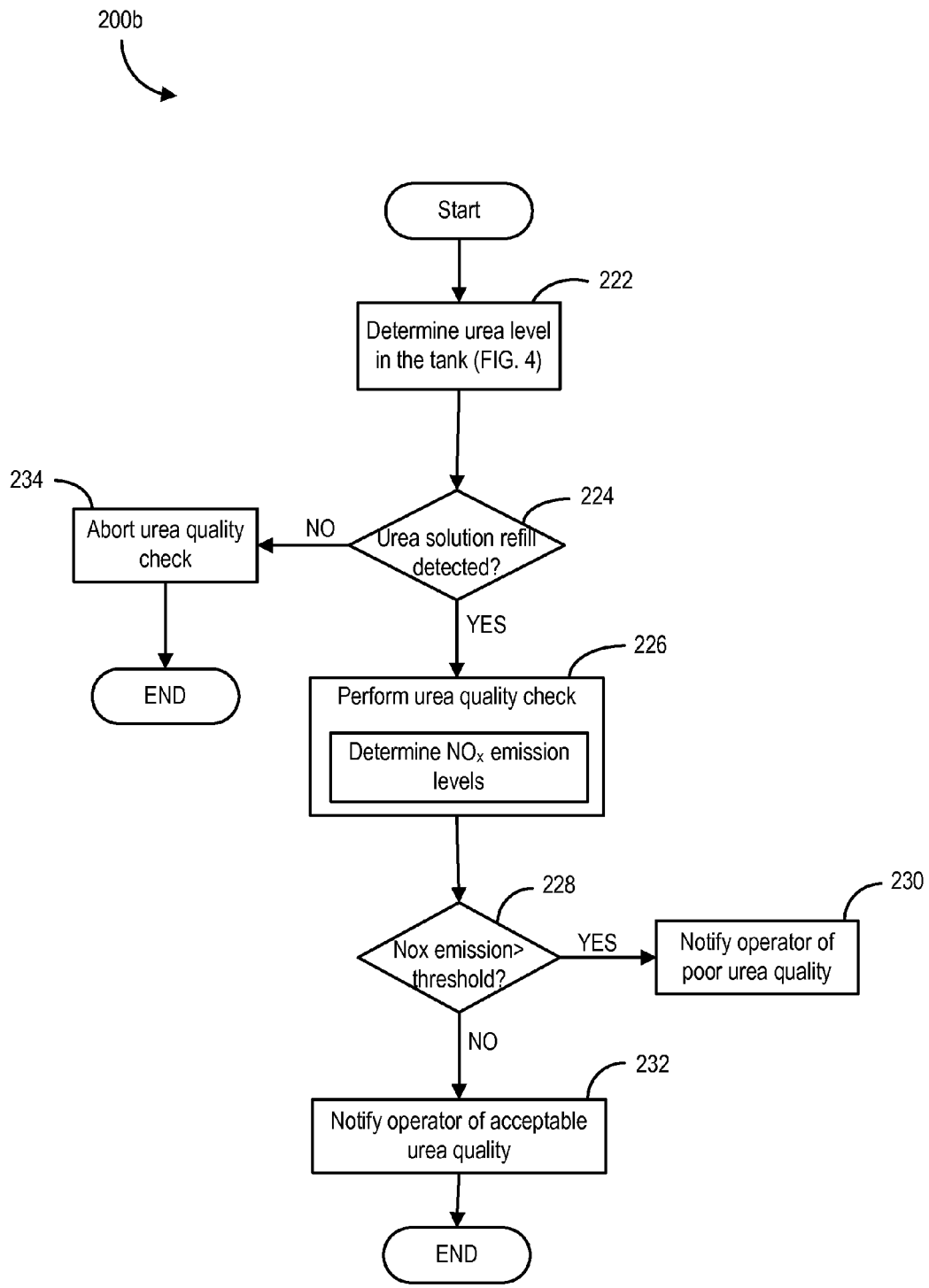

Turning to FIG. 2B, it shows a flow chart illustrating an example routine 200b for performing urea quality check after a urea refill event, and notifying a vehicle operator of urea quality. For example, based the urea quality check, vehicle operator may be notified of degradation of urea quality or acceptable urea quality.

At 222, urea level in the exhaust fluid storage tank may be determined. The urea level may be determined based on level measurement by the exhaust fluid level sensor such as an ultrasonic level sensor as described with reference to FIG. 1. The urea level may be further based on a quality of reflected signal received by the ultrasonic sensor. Details of determination of urea level in the tank will be further elaborated at FIG. 4.

Next, at 224, it may be determined if a refill of the urea solution is detected. If yes, the routine may proceed to 226, at which urea quality check may be performed to determine quality of urea in the refilled exhaust fluid storage tank. For example, certain vehicle operators may fill the exhaust fluid storage tank with water instead of urea. During such conditions, sufficient urea may not be available for thermal decomposition into ammonia due to dilution of the urea solution with water. As a result, the exhaust catalyst may be depleted of reductant, and toxic $NO_x$ gases in the exhaust may not be sufficiently reduced. Consequently, $NO_x$ emission levels may exceed the limit set by emission regulations. In order to prevent excessive $NO_x$ emission, urea quality check may be performed after an exhaust tank refill event has been detected. Performing urea quality check may include determining $NO_x$ emission levels. $NO_x$ emission levels may be determined based on $NO_x$ sensors (described with reference to FIG. 1) located upstream and downstream of the exhaust catalyst.

Upon determining $NO_x$ emission levels, at 228, the routine may check if the $NO_x$ emission levels have exceeded a threshold limit. If yes, then at 230, the operator may be notified of poor urea quality compelling the vehicle operator to take suitable action to prevent excessive $NO_x$ emission from the vehicle. If at 230, the NOx emission levels are not greater than threshold, it may be determined that urea of acceptable quality is present in the exhaust fluid storage tank and at 232, the operator may be notified of acceptable urea quality. For example, the notification regarding urea quality may be displayed on a dashboard of the vehicle. In some examples, the operator may be notified of the urea quality in the tank via a communications system, such as WIFI, Bluetooth, SYNC, or the like. For example, the controller may send a message to the operator via the communications system. The message may be displayed on a vehicle display on the dashboard or another location of the vehicle, sent to a mobile device of the operator (e.g., via a text message), emailed to the operator, etc.

In other examples, the controller may additionally or alternatively send a message via the communications system notifying a third party of the quality of urea refilled in the exhaust fluid storage tank. For example, the third party may be a vehicle dealership at which the operator purchased the vehicle and/or to which the operator takes the vehicle for service, or the third party may be another vehicle service center.

Returning to 224, if no urea solution refill is detected, then at 234, the controller may abort the urea quality check.

In this way, the urea solution refill may be detected based on urea level in the exhaust fluid storage tank. Upon detecting a refill, the urea quality check may be performed, and the vehicle operator may be notified of quality of urea in the tank after the refill event. By performing the urea quality check after each refill event, catalyst performance may be monitored, and $NO_x$ emission levels may be controlled.

Figure 2C:
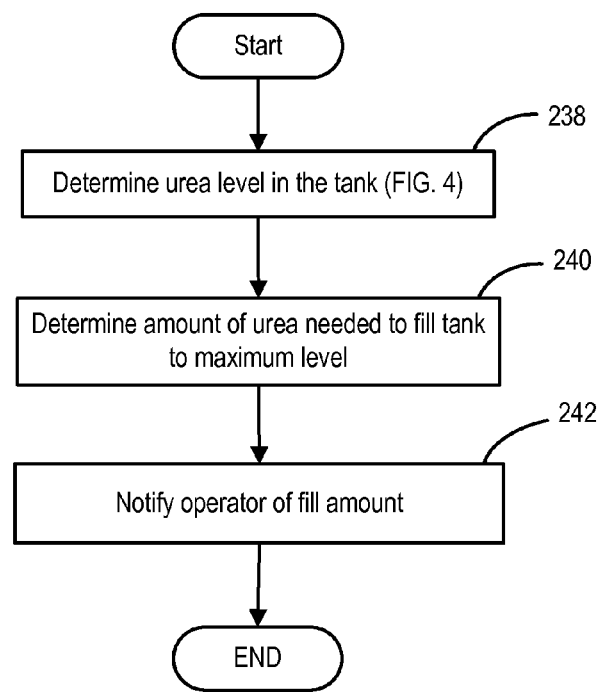

FIG. 2C shows a flow chart illustrating a routine 200c for displaying a fill amount of a urea storage tank to an operator of a vehicle.

At 238 of routine 200c, the urea level is measured. For example, the urea level may be determined based on level measurements from a urea level sensor, such as the ultrasonic level sensor described above with reference to FIG. 1. Urea level may be further based on quality of reflected signal received by the level sensor. Details of urea level measurement will be elaborated at FIG. 4. In one example, the controller may request an indication of the urea level from the urea level sensor. In another example, the urea level sensor may send a signal indicating a urea level to a controller at predetermined intervals and the controller may utilize the urea level from the last urea level sensor reading.

Once the urea level is measured, routine 200c proceeds to 240 where an amount of urea needed to fill the urea storage tank to a maximum level is determined. As an example, the controller may have stored a maximum fill level of the exhaust fluid storage tank. Based on the urea level determined at 238, the controller may calculate an amount of urea to be added to the urea storage tank to fill the urea storage tank to a maximum fill level. In other words, the controller may determine a maximum fill amount of urea.

At 242, the vehicle operator is notified of the amount of urea to be added to the urea storage tank. For example, the maximum fill amount of urea may be displayed on a dashboard of the vehicle via an indicator light. In some examples, the operator may be notified of the maximum fill amount via a communications system, such as WIFI, Bluetooth, SYNC, or the like. For example, the controller may send a message to the operator via the communications system. The message may be displayed on a vehicle display on the dashboard or another location of the vehicle, sent to a mobile device of the operator (e.g., via a text message), emailed to the operator, etc.

In other examples, the controller may additionally or alternatively send a message via the communications system notifying a third party of the amount of urea to be added to the urea storage tank. For example, the third party may be a vehicle dealership at which the operator purchased the vehicle and/or to which the operator takes the vehicle for service, or the third party may be another vehicle service center. In such an example, the third party may use the maximum fill amount to add the correct amount of urea to the urea storage tank without overfilling the urea storage tank.

In some examples, the vehicle operator (and/or third party) may fill the urea storage tank with a bottle that does not have an automatic fluid flow shut-off. In some embodiments, the vehicle operator may input the volume of the bottle via an interactive display or the like. For example, the vehicle operator may input that the bottle contains 1 liter of urea. The controller may then calculate the amount of the urea needed to fill the urea storage tank based on the urea level indicated by the urea level sensor. As an example, the controller may determine that ½ liter of urea should be added to the urea storage tank to fill the tank, and that amount to be added may be displayed to the vehicle operator. The display may further indicate that the amount of urea needed to fill the urea storage tank is half of the bottle.

Thus, an amount of urea to be added to the urea storage tank may be determined based on the urea level sensor and the vehicle operator or a third party may be notified of the amount. In this way, the urea storage tank may be filled with urea without over filling the urea storage tank and spilling urea. For example, by knowing the maximum amount of urea to add to the urea storage tank, the urea storage tank may be filled by bottles that do not have an automatic shut-off of fluid flow.

Figure 2D:
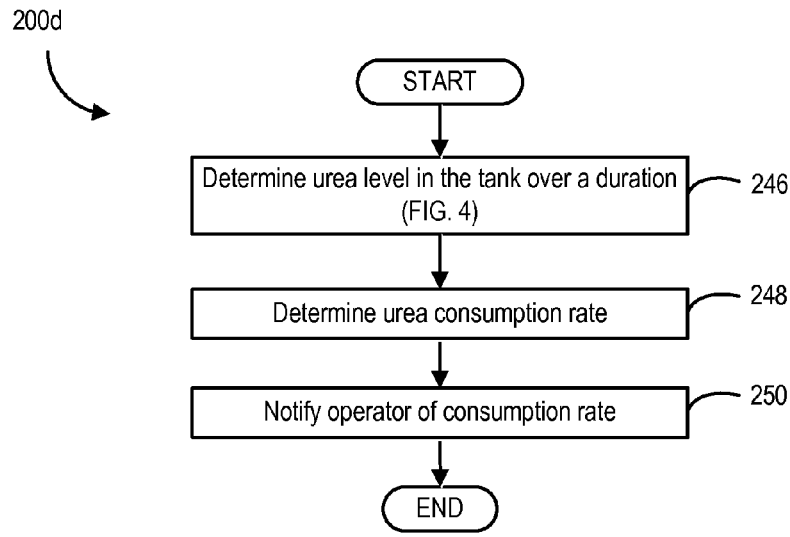

Next, FIG. 2D shows a flow chart illustrating a routine 200d for displaying a consumption rate, or usage rate, of urea to an operator of a vehicle.

At 246 of routine 200d, the urea level may be measured over a duration. Details of urea level measurement determined based on level sensor (described at FIG. 1) will be elaborated at FIG. 4. In one example, the urea level sensor may send a signal indicating a urea level to a controller at predetermined intervals throughout a duration. For example, the urea level sensor may send a signal indicating the urea level to the controller every time the vehicle is started, every time the vehicle is shutdown, after every 10, 15, 20, 30, or another desired number of minutes of vehicle operation, or the like. Further, the duration may be a number of days, weeks, or months, for example.

Based on the urea levels determined throughout the duration, the controller determines a urea consumption rate at 248. The urea consumption rate may be an average consumption rate, for example. As an example, the urea consumption rate may be a volume of urea used per unit of time. For example, the consumption rate may be a number of milliliters per day, liters per month, etc. In some examples, the vehicle operator may choose the units in which the consumption rate is calculated or communicated to the operator.

Once the urea consumption rate is determined, the operator of the vehicle is notified of the consumption rate. For example, the consumption rate may be displayed on a dashboard of the vehicle via an indicator light. In some examples, the operator may be notified of the urea consumption rate via a communications system, such as WIFI, Bluetooth, SYNC, or the like. For example, the controller may send a message to the operator via the communications system. The message may be displayed on a vehicle display on the dashboard or another location of the vehicle, sent to a mobile device of the operator (e.g., via a text message), emailed to the operator, etc.

In other examples, the controller may additionally or alternatively send a message via the communications system notifying a third party of the urea consumption rate. For example, the third party may be a vehicle dealership at which the operator purchased the vehicle and/or to which the operator takes the vehicle for service, or the third party may be another vehicle service center. The third party may keep a record of the urea consumption rate of the vehicle, for example.

In this way, the urea consumption rate may be estimated by the urea level sensor. Once the controller determines the urea consumption rate, the operator of the vehicle may be notified of the urea consumption rate directly by the controller via a display in the vehicle, or a message sent to a suitable computing device such as a mobile device or personal computer. The user may also be notified of the consumption rate via a third party, such as the vehicle dealership.

Figure 2E:
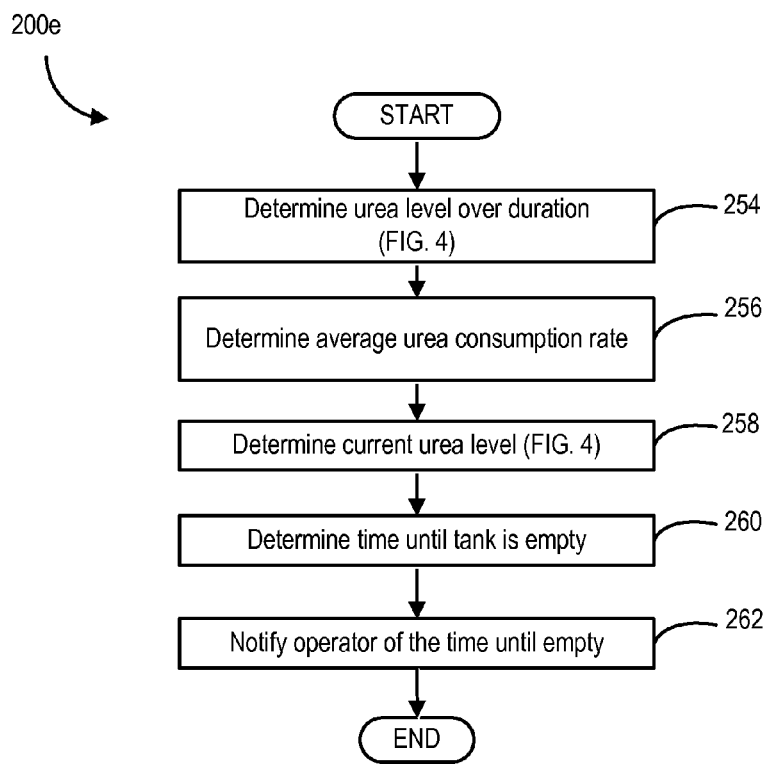

FIG. 2E shows a flow chart illustrating a routine for displaying time until empty of urea storage tank, to an operator of a vehicle.

At 254, the urea level may be determined over a duration. As described above, the urea level determination may be based on urea level sensor measurements, which will be further described at FIG. 4. In one example, the urea level sensor may send a signal indicating a urea level to a controller at predetermined intervals throughout a duration. For example, the urea level sensor may send a signal indicating the urea level to the controller every time the vehicle is started, every time the vehicle is shutdown, after every 10, 15, 20, 30, or another desired number of minutes of vehicle operation, or the like. Further, the duration may be a number of days, weeks, or months, for example.

Upon determining the urea level, an average urea consumption rate may be determined at 256. As an example, the urea consumption rate may be a volume of urea used per unit of time. For example, the consumption rate may be a number of milliliters per day, liters per month, etc. In some examples, the vehicle operator may choose the units in which the consumption rate is calculated or communicated to the operator. The average urea consumption rate may be the same consumption rate as estimated and displayed to the vehicle operator in routine 200d of FIG. 2D, for example.

At 258 of routine 200e, current urea level may be determined. Based on the current urea level and the average consumption rate determined at 256, a time or range until the urea storage tank is empty is determined at 260. As an example, a time until the urea storage tank is empty may be estimated in days, months, years, etc.

Once the time to empty of the current exhaust fluid quantity is determined, routine 200e proceeds to 262, where the operator of the vehicle may be notified of the time until empty. For example, the time until empty may be displayed via modes described above with respect to FIG. 2A-2D. The operator of the vehicle may then be notified of the time until the urea storage tank is empty via a display in the vehicle, or a message sent to a suitable computing device such as a mobile device or personal computer. The user may also be notified of the time until the storage tank is empty via a third party, such as the vehicle dealership.

In this way, based on level of urea determined, an average urea consumption rate may be calculated and an estimated time or range until the urea storage tank is empty may be determined and conveyed to the vehicle operator.

Figure 3:
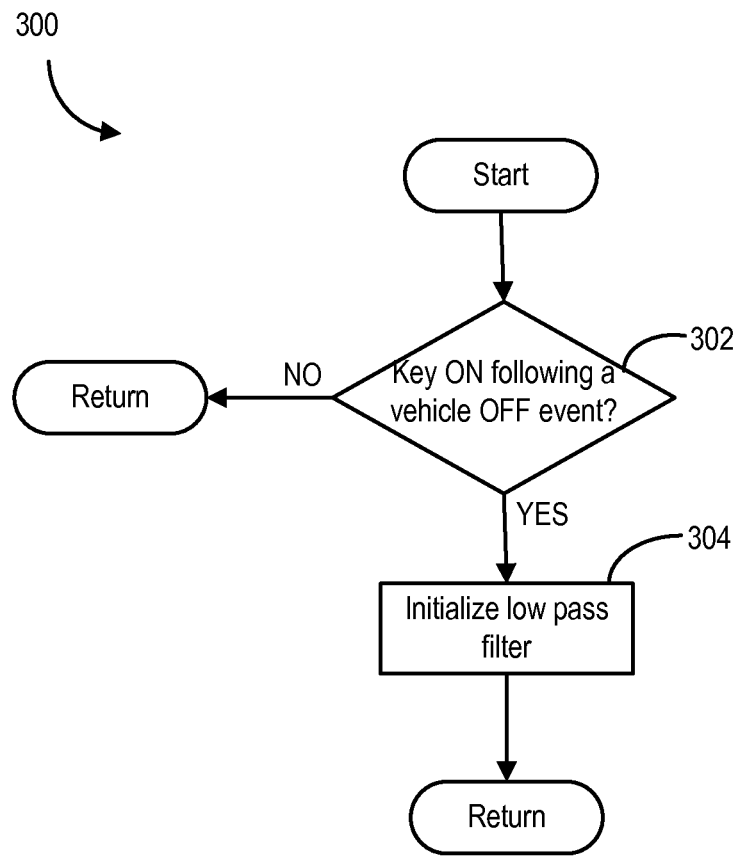
FIG. 3 shows a flowchart illustrating a routine for initializing a low pass filter prior to estimation of fluid level in an exhaust fluid storage tank.

Now turning to FIG. 3, an example routine 300 is shown for initializing a low pass filter during selected key ON conditions prior to measuring urea level in the exhaust fluid storage tank. In one example, the low pass filter may be utilized to filter the instantaneous level measurement signal from the ultrasonic level sensor to provide more accurate urea level measurements. The low-pass filter may be configured such that instantaneous level measurements (determined based on reflected signal received by the ultrasonic level sensor) may pass through the low-pass filter only when quality of the reflected signal is above a first calibratable threshold C1. Further, an output of the low-pass filter may be based on low-pass filter time constants K1 and K2, and the implementation of filters may be based on a second calibratable threshold C2. Details of low pass filter configuration that may be utilized to determine exhaust fluid level measurements will be described in greater detail at FIG. 4. It must be noted that in the example routines described below with reference to FIGS. 3 and 4, urea is used as an example exhaust fluid. It should be understood, however, that the routines may be applied to any other suitable exhaust fluid.

At 302, it may be determined if a key ON event has occurred following a vehicle OFF event. It will be appreciated that vehicle-off conditions may vary based on the configuration of the vehicle system. For example, embodiments of vehicle-off conditions may vary for hybrid-drive enabled vehicle systems, non-hybrid-drive enabled vehicle systems, and push-button engine start-enabled vehicle systems. It will be appreciated, however, that the vehicle-off conditions referred to herein are one-to-one equivalent to engine-off conditions.

As a first example, in vehicles configured with an active key, a vehicle-off condition may include a key-off condition. As such, in active key-based vehicle configurations, the active key is inserted into a keyhole to move the position of a keyhole slot between a first position corresponding to a vehicle-off condition, a second position corresponding to a vehicle-on condition, and a third position corresponding to a starter-on condition. To start cranking the vehicle engine, the key is inserted in the keyhole and the slot is moved from the first position to the third position via the second position. A vehicle-off event occurs when the active key is used to return the slot from the third position to the first position, followed by removal of the key from the slot. In response to the slot being returned to the first position and the active key being removed, an engine-off as well as a vehicle-off condition is indicated.

As a second example, in vehicles configured with start/stop button, a vehicle-off condition may include a stop button actuated condition. In such embodiments, the vehicle may include a key that is inserted into a slot, as well as an additional button that may be alternated between a start position and a stop position. To start cranking the engine, the vehicle key is inserted in the keyhole to move the slot to an "on" position and additionally the start/stop button is pushed (or actuated) to the start position to start operating the engine starter. Herein, a vehicle-off condition is indicated when the start/stop button is actuated to the stop position As a third example, in vehicles configured with a passive key, a vehicle-off condition may include the passive key being outside a threshold distance of the vehicle. The passive key may include an ID tag, such as an RFID tag, or a wireless communication device with a specified encrypted code. In such embodiments, in place of an engine keyhole, the passive key is used to indicate the presence of a vehicle operator in the vehicle. An additional start/stop button may be provided that can be alternated between a start position and a stop position to accordingly start or stop the vehicle engine. To start running the engine, the passive key must be present inside the vehicle, or within a threshold distance of the vehicle) and the button needs to be pushed (actuated) to a start position to start operating the engine starter. A vehicle-off (and also engine-off) condition is indicated by the presence of the passive key outside the vehicle, or outside a threshold distance of the vehicle.

Returning to 302, upon determining that a key ON event has occurred following a vehicle OFF condition, the low pass filter may be initialized based on values from previous drive cycle in order to provide a signal at key ON. For example, low pass filter output, two low pass filter time constants K1 and K2, and calibratable thresholds C1 and C2, may be initialized based on the values from previous drive cycle. The values from a vehicle's drive cycle may be stored in the EEPROM and therefore, the values for initializing the low pass filter may be retrieved from the EEPROM.

Upon initializing the low pass filter, the routine 300 may return to step 402 described at FIG. 4 to estimate urea level in the exhaust fluid storage tank.

Figure 4A:
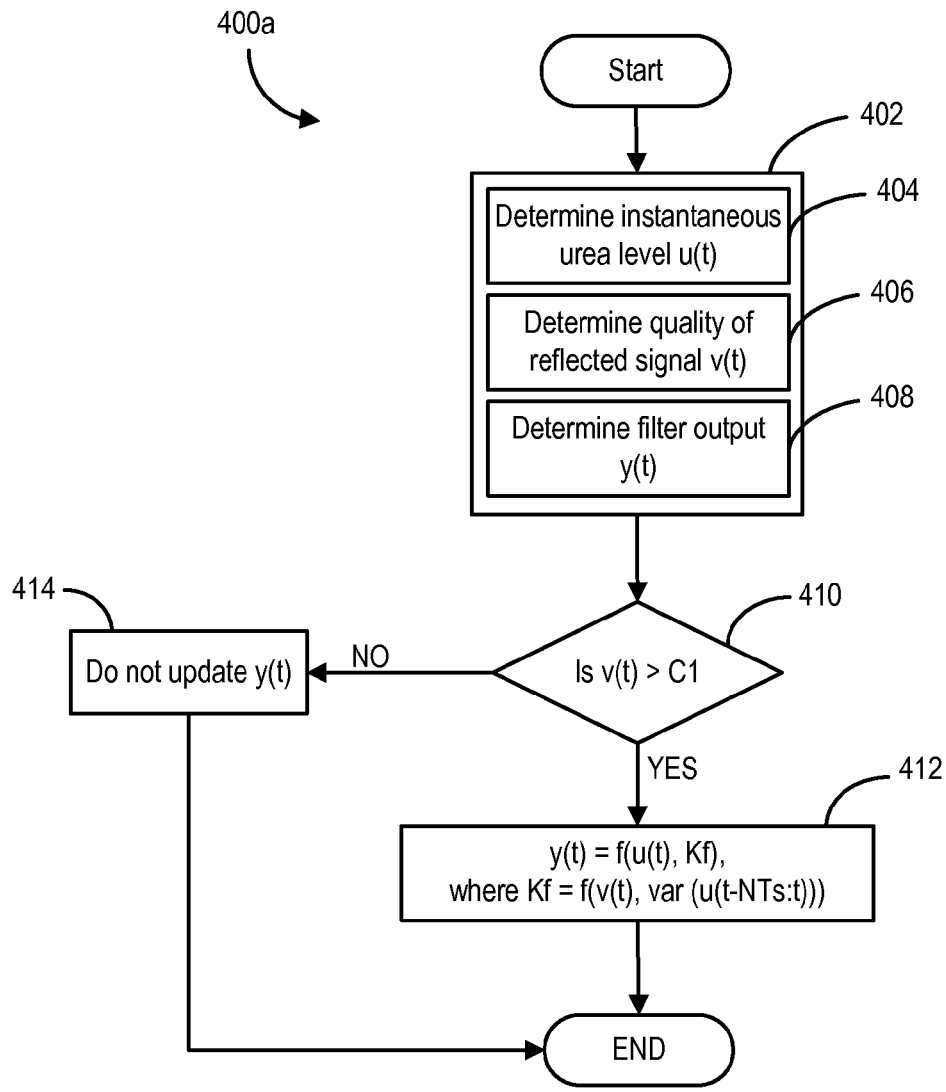
FIGS. 4A and 4B show flowcharts illustrating routines for estimating fluid level in an exhaust fluid storage tank. As explained, FIGS. 2-4A may be used together in an embodiment, such as with the system as described in FIG. 1. Similarly, FIGS. 2, 3, and 4B may be used together in an embodiment, such as with the system as described at FIG. 1.
Figure 4B:
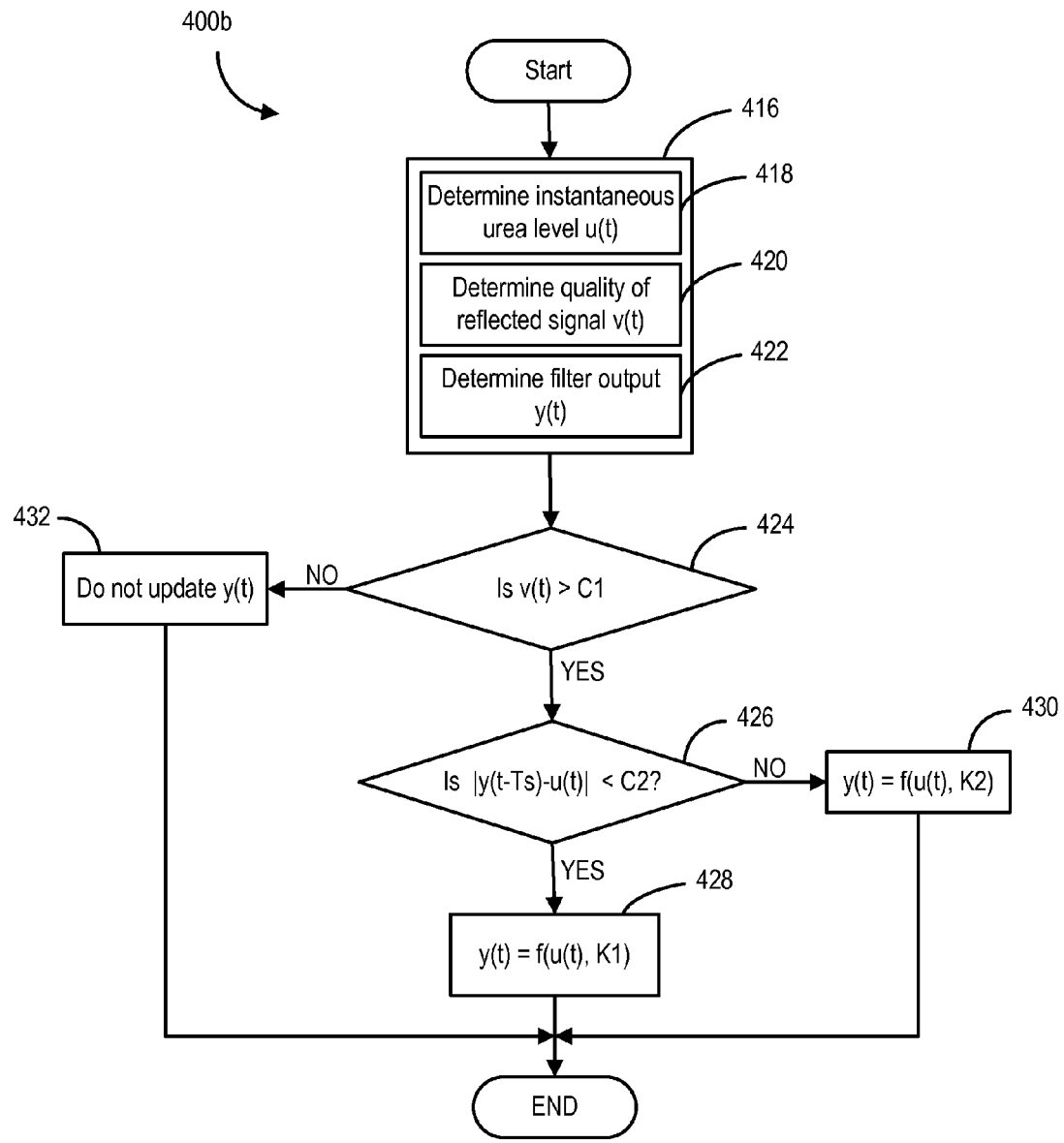
Figure 5:
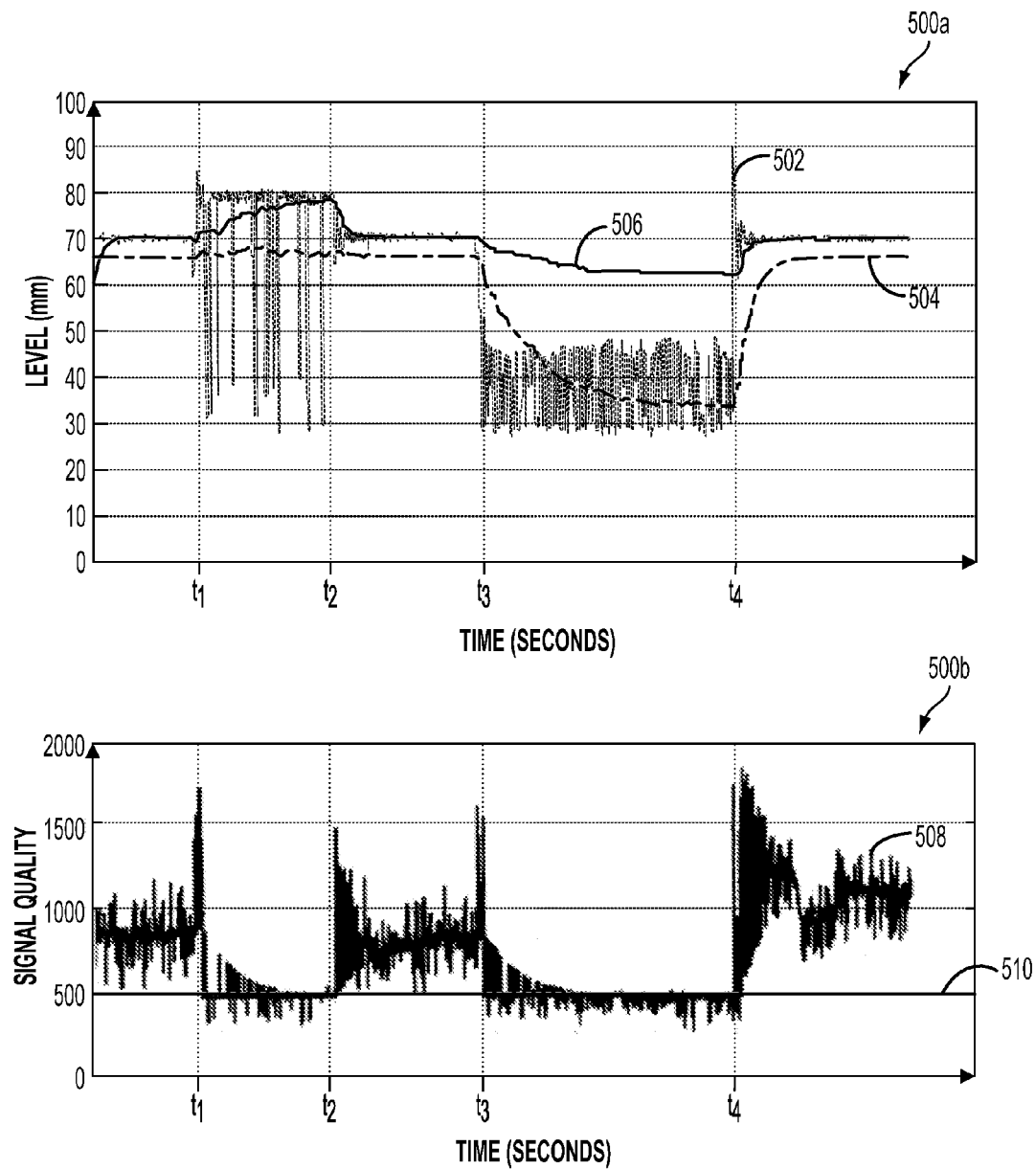
FIG. 5 shows an example fluid level measurement, including first signal of the instantaneous measurement of fluid level, and a second signal of the quality, along with filtered output signals.

If the key ON condition at 302 is not satisfied, the routine may return to step 402 of FIG. 4A or to step 416 of FIG. 4B.

In this way, during selected key ON events, the low pass filter may be initialized based on last value from the previous drive cycle.

FIGS. 4A and 4B illustrate example routines 400a and 400b for determining urea level in the exhaust fluid storage tank. Herein, urea level may be determined based on instantaneous level measurement from an ultrasonic level sensor disposed in the exhaust fluid storage tank, and indication of quality of the reflected signal received by the ultrasonic level sensor.

Turning to FIG. 4A, at 402, the routine may include the following steps of (i) determining an instantaneous urea level reading from the ultrasonic sensor u(t), (ii) determining an indication of quality of the reflected signal received by the sensor v(t), and (iii) determining an output of the low-pass filter y(t). The quality of the reflected signal v(t) may be measured as the peak voltage amplitude output by the transducer when sensing the reflected acoustic wave. As noted herein, the instantaneous urea level reading from the ultrasonic sensor u(t) may be based on a time difference between sending and receiving an ultrasonic signal to and from sensor 104. The time difference may be indicative of a distance away from the sensor at which a fluid surface is positioned, and thus can indicate the fluid level (with shorter time differences indicating lower levels, and vice versa). The signal u(t) is based on the time difference, and not based on the voltage level of the received signal. For example, even if the signal is reflected back weakly, as long as it us above a minimum threshold voltage level, it provides a valid measurement for determining the time difference. Likewise, if the signal is reflected back strongly, but indicating the same time difference as a weakly reflected signal, the same time difference, and thus level, is indicated and utilized as u(t). However, as described herein, the strength of the reflected signal is then used as a filter parameter in a discrete difference filter to ignore (e.g., to a greater or lesser degree possibly proportional to the strength) certain weak signal readings in filtering, or averaging, the sensor readings. Also, while once example of the signal u(t) is based on a time difference, various wave propagation approaches may be used, such as frequency shifting or various other combinations of time difference, frequency differences, wavelength differences, etc.

Next, at 410, it may be determined if quality, such as the strength, of reflected signal v(t) is greater than a first calibratable voltage threshold C1. The first calibratable voltage threshold C1 may be a threshold above which quality of reflected signal may be considered high, and below which quality of reflected signal may be considered low. If at 410, quality of reflected signal is not greater than threshold C1, the routine may proceed to 414. At 414, the instantaneous level measurement u(t) may not be passed through the low pass filter, and the filter output y(t) may not be updated to a new in the controller, but rather the previous determined value, e.g., at t−Ts, where Ts is the sampling time may be maintained and output. For example, if it is determined that the quality of the reflected signal is not greater than C1, the reflected signal may be considered unreliable. Low signal quality and hence, unreliable signals may occur when the urea surface is not parallel to the ultrasonic transducer (that is, the urea surface may be at an angle with respect to the ultrasonic transducer) such as during periods of large acceleration or tank inclination changes, for example. Therefore, the quality condition v(t)>C1 prevents any update to the filter output when the signal quality is not reliable and the filter may continue to generate an output based on previous level indications.

Returning to 410, if the signal quality is greater than C1, the routine may proceed to 412. For example, if the quality of the reflected signal is greater than C1, it may be determined that the signal quality is high and therefore, the signal may be considered reliable. Consequently, upon determining the signal to be reliable, the instantaneous level reading may be low-pass filtered as described below.

At 412, upon confirming high quality of the reflected signal, the controller may determine the low pass filter output y(t) based on a low pass filter time constant Kf, and the instantaneous level measurement u(t) such that, y(t)=f (u(t), Kf). The low pass filter time constant Kf may be based on the quality of reflected signal v(t), and a variance of the instantaneous level measurements over the last N samples (N is the number of samples). The variance may include a measure of how far a set of samples of the reflected signal is spread out. In one example, the variance may be determined based on a probability density function assuming a random distribution of the data.

In one example, low pass filter time constant may be defined as Kf=f(v(t), var(u(t−NTs:t))). The time constant Kf may be calibrated such that the function f(v(t), var(u(t−NTs:t))) specifies a relatively shorter time constant when the instantaneous level measurement is of higher quality and lower variance, and such that the function f(v(t), var(u(t−NTs:t))) defines a relatively longer time constant when the instantaneous level measurement has lower quality and/or higher variance. For example, during conditions that cause tank inclination, the quality of the instantaneous level measurement may be lower, and during sloshing conditions (such as during periods of large acceleration, or vehicle operation on rough terrains) the variance may be higher. During such conditions of lower signal quality and/or higher variance, a longer time constant for the low pass filter may be implemented. By making the filter time constant longer, sensitivity of the filter to erroneous level measurements may be reduced. In other words, the filter may not respond quickly to undesirable changes in the level measurements (during sloshing, inclination, etc.) when the quality of instantaneous level measurements is lower and/or when the variance is higher.

However, the filter output may be sensitive to tank refill or leak events. For example, upon tank refill or occurrence of leak, the initial instantaneous level measurement may increase or decrease suddenly, and the subsequent instantaneous level measurements may not show large variations (contrary to sloshing conditions which may show large variations in the instantaneous time measurements). Therefore, the quality of the signal may be higher and the variance may be lower. Consequently, the filter output may be based on a shorter filter time constant. As a result, due to the shorter filter time constant, the filter may respond more quickly to changes due to refill or leak, and may detect a refill or leak event on a faster time scale than when a longer time constant is used such as during inclination or sloshing conditions.

In this way, by utilizing a low pass filter as described above, level of urea in the exhaust fluid storage tank may be measured. By configuring the low pass filter time constant based on quality of the reflected signal and variance of the instantaneous level measurement over a predetermined number of samples, various effects on level measurements, such as tank inclination, vibration, and/or sloshing, for example, may be reduced, and hence more accurate level measurements may be obtained. Further, the filter described above enables faster detection of tank refill or leak.

In one example, described at FIG. 4B below, a low pass filter may adopt a faster or slower time constant based on difference between an instantaneous level measurement and a filtered output.

FIG. 4B illustrates an example routine 400b for determining exhaust fluid level measurement.

At 416, the controller may determine an instantaneous urea level u(t) based on an instantaneous reading from an exhaust fluid level sensor such as an ultrasonic level sensor. The controller may further determine a quality of a reflected signal v(t) based on an amplitude of the reflected signal, and an output from a low pass filter. As discussed previously herein, the instantaneous level measurement u(t) may be based on a time difference between an ultrasonic signal sent by the sensor and a reflected wave received by the sensor.

At 424, it may be determined if the quality of reflected signal is greater than a first calibratable threshold C1. If yes, at 426, upon confirming the quality of reflected signal to be greater than the threshold C1, it may be determined if the difference between the instantaneous measurement and the filtered output is less than a second calibratable level threshold C2 (that is, if |y(t−Ts)−u(t)|<C2, where Ts is the sampling time). If yes, the routine may proceed to 428, where the controller may determine filter output based on the instantaneous level measurement u(t), and smaller low pass filter time constant K1. For example, if the variation in level measurement is lower than threshold, smaller low pass filter time constant may be utilized. In this way, changes in the level measurements may be captured more quickly without the need to filter out large signal variations However, if the difference between the instantaneous level measurement and the filtered output is greater than the second calibratable threshold C2, the routine may proceed to 430. At 430, the controller may utilize larger time constant K2 for the filter and therefore, the filter output y(t) may be based on the instantaneous level measurement and larger low pass time constant K2. By utilizing a larger low pass filter time constant when the instantaneous level measurement is far from the filtered output, the impact of outlier level measurements may be reduced. Low pass filter time constants K1 and K2 may be defined as functions of vehicle acceleration.

Returning to 424, if the quality of the reflected signal is not greater than the threshold C1, that is, when the signal is unreliable, the filter output may not be updated. Instead, a latest previous filter output which was obtained when the signal quality was reliable may be used (that is, at time t-Ts, where Ts is the sampling time).

In this way, by utilizing a low pass filter configured based on quality of signal received by the exhaust sensor, errors in level measurements sue to vibration, inclination, and/or sloshing of the exhaust fluid storage tank may be reduced. Further, by configuring the low pass filter time constants based on vehicle acceleration, effects of signal variations due to vehicle acceleration may be reduced, and changes in urea level may be captured more quickly and efficiently. In some examples, the selection of the higher or lower parameter (e.g., K1, K2) may also be based on the signal quality, such that a larger time constant may be applied for lower signal quality, and vice versa, in addition to the selective input of the signal based on signal quality. In still another example, signal quality may be based on a relative amplitude of the reflected wave, such as the amplitude of the reflected signal as compared with the amplitude of the wave sent by the sensor. For example, as the relative amplitude between the received to sent signal decreases, a proportionally lower quality can be indicated, and then used for filtering as described herein.

Thus, in one example, an instantaneous sensor output may not be passed through a filter, and the level measurement value may not be updated in the controller when the reflected signal is less reliable. Only when the quality of the reflected signal is above the threshold, instantaneous sensor output may be passed through a low-pass filter, and a value of the filter output (that is, the level measurement) may be updated in the controller. When not updated, previous filter outputs are maintained so that a level estimate is available irrespective of whether the filter is updated.

Turning to FIG. 5, an example filter output indicating exhaust fluid level measurements during different conditions of exhaust fluid storage tank inclination is shown. Specifically, graph 500a shows instantaneous level measurement from an ultrasonic level sensor at plot 502, level measurement after passing through the ultrasonic sensor's filter at 504, and level measurement after passing through the filter described herein (at FIG. 4B) at plot 506. The graph is plotted with level (in millimeters) along y-axis, and time (in seconds) along x-axis. Graph 500b shows quality of the reflected signal received by the ultrasonic sensor (plot 508) with respect to threshold 510 at time points when instantaneous level measurements are determined. Graph 500b is plotted with signal quality along y-axis, and time (in seconds) along x-axis.

At t1, the tank may be inclined toward the level sensor due to vehicle inclination, for example. Further, between t1 and t2, the tank may continue to be inclined toward the level sensor. Since the tank is inclined toward the level sensor, the fluid level above the level sensor may increase. Further, due to inclination of the tank, the exhaust fluid surface may not be parallel to the level sensor. As a result, instantaneous level measurements may indicate high and low measurements (plot 502). These high and low measurements during tank inclination mostly correspond to low signal quality (that is, signal quality below threshold 510) as indicated at plot 508 in graph 500b. The filter described herein at FIG. 4B, takes into account the quality of reflected signal, and the filter output (plot 506) is adjusted based on signal quality. For example, the instantaneous measurement is passed through the low pass filter and an output of the filter is updated in the controller only if the quality of signal is above threshold 510. The level sensor filter, on the other hand, does not adjust its output (plot 504) based on signal quality.

At t2, due to changes in vehicle operation, the tank may return back to a level position (that is, the tank may not be inclined toward or away from the sensor). Consequently, surface of exhaust fluid may be parallel to the ultrasonic sensor. Therefore, between t2 and t3, due to exhaust fluid tank being at level with the exhaust fluid sensor, the signal quality may be above the threshold 510 (plot 508) and accordingly, instantaneous level measurements (plot 502) may be consistent (without large variations), and outputs from the level sensor filter (plot 504) and the filter described at FIG. 4B (plot 506) may be consistent.

Next, at t3, due to another change in vehicle operating conditions, the tank may be inclined away from the sensor and may continue to remain inclined away from the sensor until t4. Due to tank inclination between t3 and t4, the exhaust fluid surface may not be parallel to the level sensor. Therefore, instantaneous level measurements may show high and low measurements (plot 502), and correspondingly, the signal quality (plot 508) may drop below threshold 510. Further, due to tank inclination, even though there is no change in the total amount of exhaust fluid in the tank, level of exhaust fluid above the sensor may decrease. Since, the level sensor's filter does not account for quality of the signal; output from the level sensor's filter (504) may indicate significantly lower exhaust fluid measurements than the expected value. However, the filter described herein, by taking into account quality of reflected signal, produces more accurate output (plot 506) that is closer to the expected value and is robust to large variations in level measurements.

Finally, at t4, the tank may not be inclined and the exhaust fluid surface may be parallel to the level sensor. Accordingly, signal quality (plot 508) may be above the threshold 510, and filter outputs (plots 504 and 506) may be consistent with the expected value.

In this way, by utilizing signal quality as a basis for filtering the instantaneous output, errors in exhaust fluid level measurements due to tank inclination, vehicular vibrations, and/or sloshing, for example, may be reduced.

Figure 6:
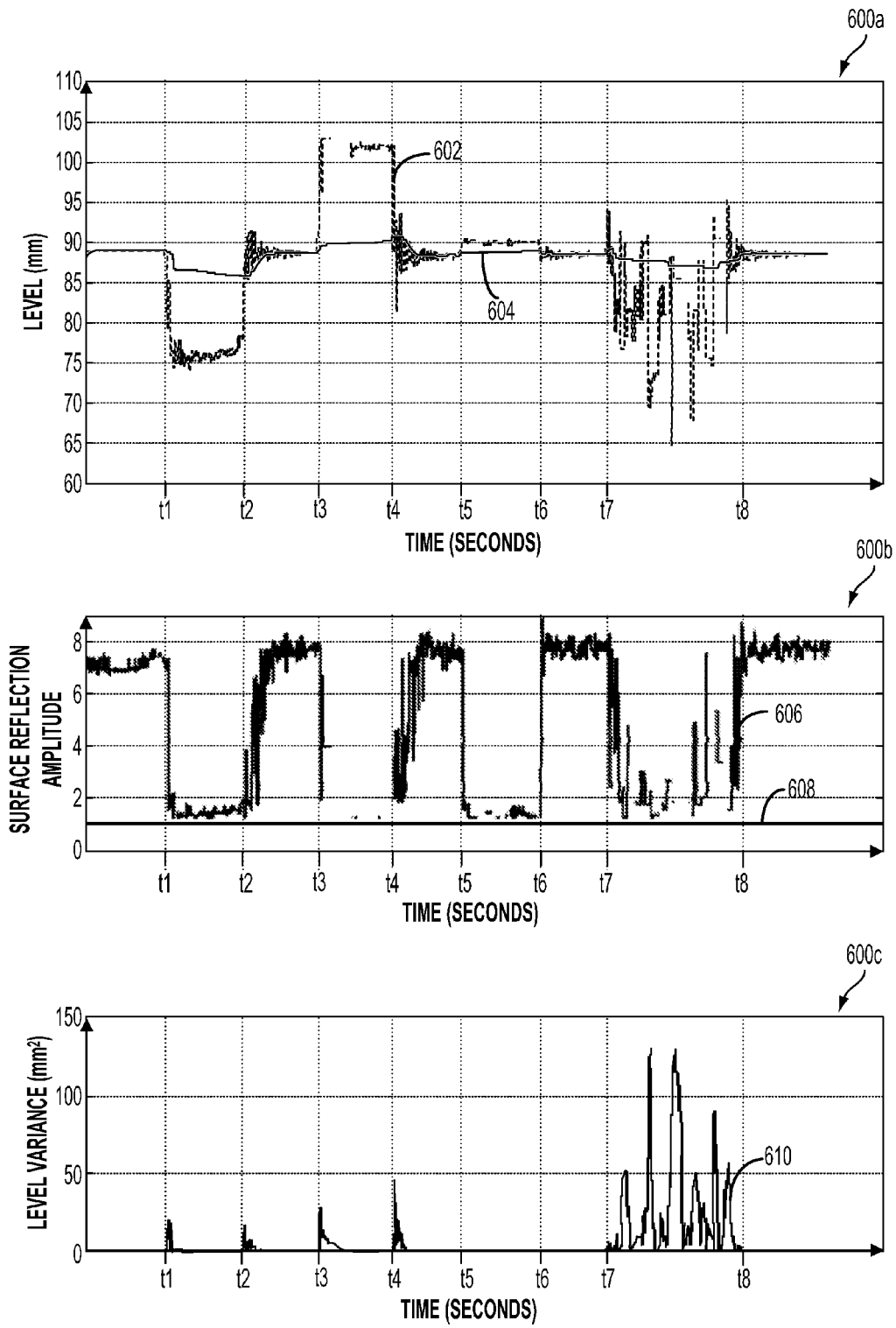
FIG. 6 shows an example fluid level measurement, including first signal of the instantaneous measurement of fluid level, a second signal of the quality, and a variance of the instantaneous measurement, along with filtered output signals.

FIG. 6 shows an example exhaust fluid level determination during conditions such as tank inclination, shaking, etc. by utilizing a low pass filter with time constant configured based on signal quality and instantaneous level measurement variance, wherein the low pass filter may be implemented as described at FIG. 4A.

Specifically, at graph 600a, instantaneous level measurement output by an exhaust fluid level sensor is shown at plot 602, and filtered output based on a low pass filter configured based on signal quality and instantaneous level variance is shown at plot 604. Graph 600a is plotted with level measurements (in millimeters) along y-axis and time along x-axis. Next, at graph 600b, quality of reflected signal (that is, amplitude of reflected signal received by the fluid level sensor) is shown at plot 606, and a calibratable quality threshold below which signal quality may be considered to be unreliable is shown at plot 608. Graph 600b is plotted with amplitude of the reflected signal received by the exhaust fluid sensor along y-axis and time along x-axis. Graph 600c shows variance of instantaneous level measurement (based on parameter N=5, where N is the number of samples) at plot 610. Graph 600c is plotted with level variance (in millimeter$^2$) along y-axis and time along x-axis.

Prior to t1, the tank may not be inclined. In other words, surface of an exhaust liquid may be parallel to an upper and a lower surface of an exhaust fluid storage tank. Therefore, amplitude of the reflected signal (plot 606) may be higher than the threshold 608, and variance of the instantaneous level measurement may be low (plot 610). Due to high quality of the reflected signal and low variance, shorter filter time constant may be implemented. Output of the filter (604) and the instantaneous level measurement (602) may be consistent without large variations.

Next at t1, the tank may be inclined away from the sensor and subsequently, between t1 and t2, the tank may continue to be inclined away from the sensor. Due to tank inclination, signal amplitude decreases (606) and at certain time points during the inclination, the signal amplitude may decrease below the threshold 608. During those time points when the signal amplitude drops below the threshold, the filtered level may not be updated in the controller. The signal amplitude data when the signal amplitude is below the threshold is removed from the graph and can be seen as gaps in the signal amplitude plot 606. At other time points during the inclination when the signal amplitude is not below the threshold, a longer time constant may be implemented due to higher variance (plot 610) and lower signal quality (plot 606). As a result, the filter may take longer time to respond to large variations and hence, a gradual drop in the filtered level (604) may be seen. The longer time constant is advantageous when performing level measurements during periods of inclination, sloshing, and/or vibrations, etc. since it filters out large variations and slows down the filtered output, thereby providing more accurate level measurements. Further, the calibratable threshold 608 may be adjusted such that moderately low signal amplitudes may not be eliminated in order to be able to detect tank refill or leak at moderate inclinations.

Next, at t2, the tank may be returned back to level position and may continue to be at level (that is, not inclined) between t2 and t3. Consequently, signal amplitude (plot 606) may be higher than the threshold 608 (hence, reliable signal), and variance may be low (plot 610). Due to higher signal quality and smaller variations, a shorter low pass time constant may be implemented. As a result, the filter may respond more quickly to the instantaneous level measurements, and the instantaneous level measurement (602) and the filtered output (604) may be consistent.

At t3, due to changes in vehicle operating conditions, the tank may be inclined toward the sensor. The tank may continue to remain in an inclined position between t3 and t4. Due to inclination, there may be large variations in the instantaneous level measurements (plot 602), and consequently the variance may be higher (plot 610). Further, the signal quality (plot 606) may be low (sometimes below the threshold 608). Consequently, due to higher variance and lower signal quality, a longer low pass filter time constant may be implemented, and the filtered output (plot 604) may indicate a slow increase in the level measurement. However, due to large variations being filtered out and slow response of the filter, the filtered level measurements (plot 604) may remain close to the actual level.

Next, at time points between t4 and t5, between t6 and t7, at t8, and after t8, inclination of the tank may be removed and the tank may be leveled. As discussed above, based on higher quality signal (plot 606) and lower variance (plot 610) of the instantaneous level measurements when the tank is not inclined, shorter low pass filter constant may be implemented. Consequently, the filter response may be faster and the instantaneous level measurements (602) and the filtered output (604) may be consistent.

At t5, and between t5 and t6, the tank may be tipped sideways. In this case, the signal quality may be low (plot 606) and variance of the instantaneous measurement may be low (plot 610). Due to low quality of the reflected signal (plot 606), longer filter time constant may be implemented and as discussed above, filtered output (plot 604) may not vary largely from the actual fluid level.

Next, starting at t7, and between t7 and t8, the tank may experience sloshing. Consequently, instantaneous level measurements show large variations as indicated at plot 602 and at plot 610, and quality of the reflected signal may be low (with some signal amplitudes being below the threshold). Similar to inclination conditions, during sloshing due to high variance of the instantaneous measurements and low quality of the reflected signal, a longer filter time constant may be implemented to filter out large variations and slow the filter response. As a result, the filtered output (plot 604) may not be affected to a great extent by large variations, and may indicate level measurements close to the actual exhaust fluid level in the tank.

In this way, by passing instantaneous level measurements from the level sensor through the low pass filter, exhaust fluid level measurements may be obtained. By configuring the low pass filter time constant based on quality of the reflected signal, and variance of the instantaneous level measurement, more accurate level measurements may be obtained.

Figure 7:
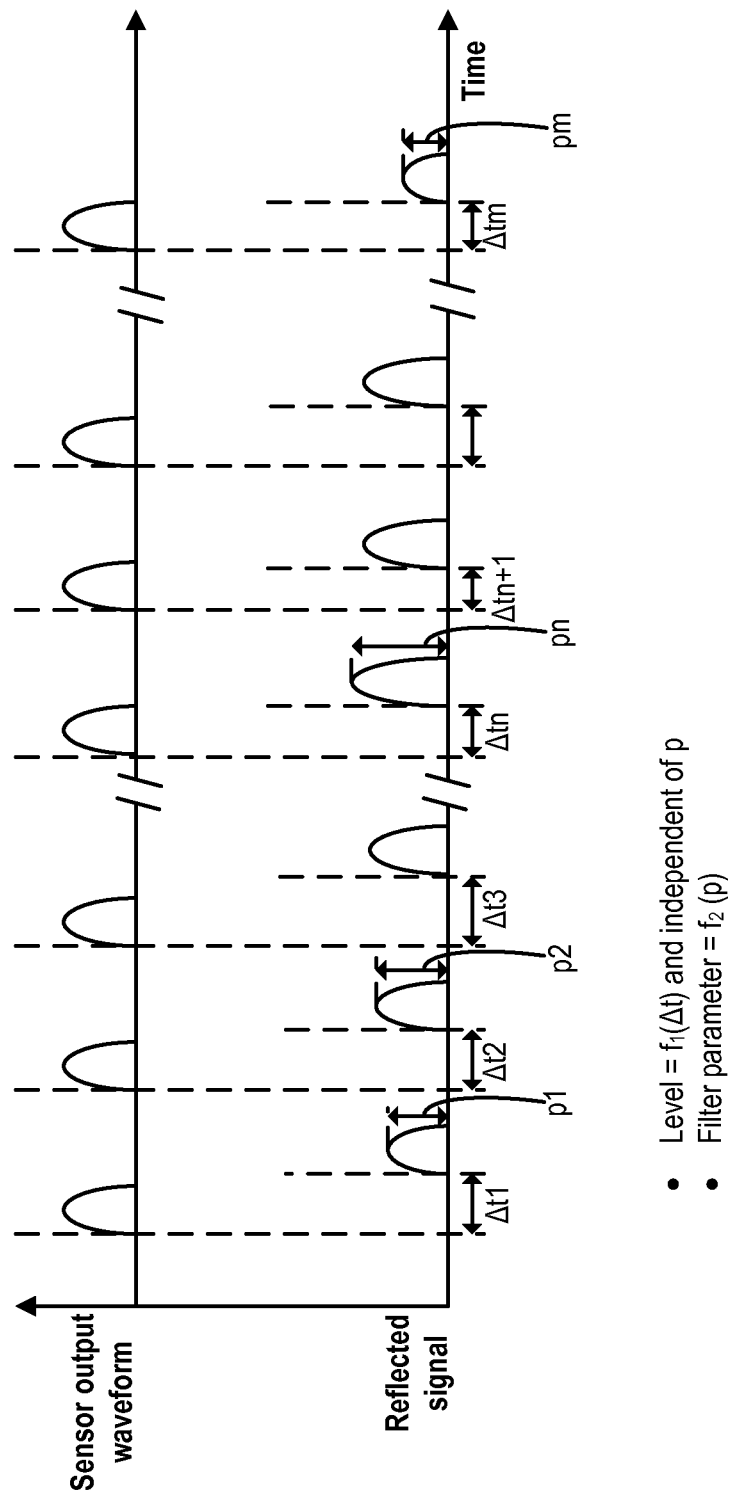
FIG. 7 shows example level sensor signals, such as a first signal ($\Delta t$) and a second signal (p).

FIG. 7 shows example signals representing sample waveforms generated by the level sensor, including the waveform sent out of the sensor toward the fluid surface in the upper plot, and the received waveform that is reflected back in the lower plot. Further, example time differences ($\Delta t$) are shown with different peak amplitudes (p). As illustrated, the same waveform generated by the sensor can have different reflections depending on the conditions, such due to ripples and/or tilting of the tank. For example at samples 1, 2, and 3, the tank/vehicle may be level, whereas at samples n, n+1, etc. the tank/vehicle may be tilted forward, and at samples m, m+1, etc., the tank/vehicle may be tilted backward or toward the side. Thus, the plots illustrate the distinct nature of the different parameters $\Delta t$ and p.

Note that the example control routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Further, one or more of the various system configurations may be used in combination with one or more of the described diagnostic routines. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
generating an ultrasonic signal in an exhaust fluid tank of a vehicle;
in response to a strength of a received reflection of the ultrasonic signal being greater than a threshold, filtering the reflection based on a variance of the received reflection, and indicating a fluid level based on the filtered reflection; otherwise, not filtering the reflection, and maintaining a previous latest fluid level indication; and,
limiting an output of an engine of the vehicle based on the level indication,
wherein the fluid level is further based on a time shift of the reflected ultrasonic signal, and wherein the variance is a variance of instantaneous level measurements over the last N samples, where N is a number of samples, wherein the variance is a measure of a spread of the received reflection from a predetermined number of reflections received prior to the received reflection, the variance determined based on a probability density function assuming a random distribution of the received reflections.

2. The method of claim 1 wherein the strength is based on a voltage amplitude of the reflected ultrasonic signal at a receiver, wherein the reflection is filtered with a difference filter having a parameter based on the strength.

3. The method of claim 2 wherein the difference filter is further based on the variance of the reflection, and wherein filtering the reflection based on the variance comprises: applying a longer time constant for the difference filter for higher variances, and applying a shorter time constant for the difference filter for lower variances.

4. The method of claim 3 wherein exhaust fluid includes urea, and wherein the difference filter is further based on a vehicle acceleration.

5. The method of claim 2 wherein exhaust fluid includes ammonia, and wherein a time constant for the difference filter is based on an absolute difference between the previous latest fluid level indicated by a previous latest filtered output and the fluid level indicated by the time shift of the received reflection, wherein a shorter time constant is applied when the absolute difference is less than a threshold difference, otherwise a longer time constant is applied.

6. The method of claim 1 further comprising indicating degradation of urea quality based on the indicated fluid level, determining an operation range of the vehicle based on the indicated fluid level, and notifying an operator of the vehicle of the operating range.

7. The method of claim 1 wherein the strength is based on a relative voltage amplitude of the reflected signal to an amplitude of the generated ultrasonic signal; and further comprising, indicating a lower strength as the relative voltage amplitude decreases.

8. A method, comprising:
generating an exhaust fluid level indication in an exhaust fluid storage tank via a time difference of an acoustic wave signal reflected from a surface of exhaust fluid;
using the level indication as an input to a low-pass filter only when a peak voltage amplitude of the reflected acoustic wave signal is greater than a threshold, but continuing to generate a filter output based on previous level indications;
indicating degradation of urea quality based on the level indication; and
limiting an engine output based on the level indication, wherein a low-pass filter time constant of the low-pass filter is based on a variance of the level indication, wherein the variance is a measure of a spread of the level indication from a predetermined number of previous level indications, and wherein the variance is a variance of instantaneous level measurements over the last N samples, where N is the number of samples, the variance determined based on a probability density function assuming a random distribution of the samples.

9. The method of claim 8 wherein the low-pass filter time constant of the low-pass filter is further based on the peak voltage amplitude of the reflected acoustic wave signal.

10. The method of claim 9 wherein the exhaust fluid includes urea.

11. The method of claim 10 wherein the exhaust fluid includes ammonia, and wherein if the variance is below a threshold, a shorter time constant is implemented for the low-pass filter, and otherwise, a longer time constant is implemented.

12. A method, comprising:
at a controller positioned in a vehicle, receiving a first signal from an exhaust fluid ultrasonic sensor positioned in a tank coupled to an injector in an exhaust of an engine of the vehicle indicating a fluid level, receiving a second signal from the sensor indicating a strength of an ultrasonic wave reflection, generating a filtered level by filtering the first signal only when the second signal is greater than a threshold, and limiting an output of the engine based on the filtered level, and otherwise keeping a previous filtered level and limiting an output of the engine based on the previous filtered level, the filtering including implementing a shorter time constant for low-pass filtering for a smaller variance of the fluid level, and implementing a longer time constant for the low-pass filtering for a larger variance of the fluid level, wherein the variance of the fluid level is a measure of a spread of the level indication from a predetermined number of previous level indications, wherein the variance of the fluid level is a variance of instantaneous level measurements over the last N samples, where N is the number of samples, the variance of the fluid level determined based on a probability density function assuming a random distribution of the samples.

13. The method of claim 12 wherein the injector is positioned upstream of an SCR emission control device in the engine exhaust.

14. The method of claim 12 wherein the strength is based on a peak amplitude of the second signal, the second signal distinct from the first signal and received in parallel at the controller with the second signal.

15. The method of claim 14 wherein the ultrasonic wave is generated at a selected frequency.

16. The method of claim 15 wherein the first signal is based on a time difference between when the sensor generates the ultrasonic wave and when the sensor receives a reflection of the ultrasonic wave.

17. The method of claim 13 further comprising, determining an operating range of the vehicle at the controller based on the filtered level when the second signal is greater than the threshold, and notifying an operator of the vehicle of the operating range.

* * * * *